(12) United States Patent
Tanaglia

(10) Patent No.: US 7,482,408 B2
(45) Date of Patent: Jan. 27, 2009

(54) ELASTOMERIC BLENDS BASED ON CARBON BLACK

(75) Inventor: Tiziano Tanaglia, Bologna (IT)

(73) Assignee: Polimeri Europa S.p.A., Brindisi (IT)

( * ) Notice: Subject to any disclaimer, the term of this patent is extended or adjusted under 35 U.S.C. 154(b) by 404 days.

(21) Appl. No.: 11/014,772

(22) Filed: Dec. 20, 2004

(65) Prior Publication Data

US 2005/0148724 A1 Jul. 7, 2005

(30) Foreign Application Priority Data

Dec. 22, 2003 (IT) .......................... MI2003A2550

(51) Int. Cl.
C08C 19/04 (2006.01)

(52) U.S. Cl. .................. 525/387; 525/240; 524/504

(58) Field of Classification Search .................. 525/240, 525/387; 524/502
See application file for complete search history.

(56) References Cited

U.S. PATENT DOCUMENTS

| 3,067,118 | A | 12/1962 | Haper et al. |
| 3,884,992 | A | 5/1975 | Gros |
| 4,743,391 | A | 5/1988 | Gordon et al. |
| 5,428,099 | A | 6/1995 | Morrar et al. |
| 5,728,766 | A | 3/1998 | Schauder et al. |
| 6,506,842 | B1 | 1/2003 | Heck et al. |
| 6,548,600 | B2 * | 4/2003 | Walton ........................ 525/191 |
| 6,590,031 | B2 * | 7/2003 | Harvey et al. ............... 524/833 |

FOREIGN PATENT DOCUMENTS

| EP | 1 013 673 A1 | 6/2000 |
| GB | 988846 | 4/1965 |

* cited by examiner

Primary Examiner—Robert D. Harlan
(74) Attorney, Agent, or Firm—Oblon, Spivak, McClelland, Maier & Neustadt, P.C.

(57) ABSTRACT

Elastomeric blends are described, comprising an elastomeric composition and carbon black, the above elastomeric composition consisting of:
  (i) one or more elastomers (A) selected from ethylene-propylene (EPM) copolymers and ethylene-propylene-diene (EPDM) terpolymers;
  (ii) one or more elastomers (B) selected from ethylene-propylene (EPM) copolymers and ethylene-propylene-diene (EPDM) terpolymers and relative mixtures, the above elastomers having been previously treated with at least one hydroperoxide at a temperature ranging from 80° C. to 250° C. so as to undergo a reduction in the molecular weight: the weight ratio between the elastomers (i) and (ii), having a sum of 100, being from 0/100% to 90/10%.

13 Claims, 3 Drawing Sheets

ELASTOMERIC BLENDS BASED ON CARBON BLACK

The present invention relates to elastomeric blends based on carbon black containing elastomers deriving from EP(D)M and the process for their preparation.

The preparation of the blends of the present invention has the advantage of requiring lower times with respect to the usual techniques, and a lower energy consumption.

As is known, elastomers in general, and ethylene-propylene elastomers in particular, are mixed with a wide number of ingredients to obtain the final blend.

Among these ingredients, those present in the greatest quantity are fillers and extension oils which, in most cases, are carbon black and paraffinic oils.

In particular, the dispersion of carbon black, i.e. the gradual decrease in the dimension of the aggregates of particles during the mixing phase, is the main factor for determining the duration of the mixing time.

On the other hand, as is well known to experts in the field, the dispersion of carbon black considerably influences the processability characteristics of the blend.

EP-A-1013673 describes the use of products of a hydroperoxide nature for reducing the molecular weight of ethylene-propylene copolymers and obtaining polymers which are difficult to produce in industrial polymerization plants.

In the transformation process described in EP-A-1013673, the polymeric base is subjected to high shear treatment, in the presence of a substance of a hydroperoxidic nature having the characteristic of not having a significant decomposition under the thermal conditions of the treatment, this concept being expressed through the halving time which should not be lower than the process time, preferably not lower than 10 times the process time. The process is carried out at high shear values, which can be applied using common transformation machines of polymeric materials, preferably in a twin-screw extruder.

It has now been found that, by using, as part of the polymeric base, a product obtained according to the process described in EP-A-1013673, it is possible to obtain an elastomeric blend which requires reduced mixing times to be packed into traditional mixers.

The blend, object of the present invention, can be produced with a lower mixing energy consumption and with a higher productivity, thus causing a distinct saving in the overall cost of the blend.

In accordance with this, the present invention relates to elastomeric blends comprising an elastomeric composition and carbon black, the above elastomeric composition consisting of:

(i) one or more elastomers (A) selected from ethylene-propylene (EPM) copolymers and ethylene-propylene-diene (EPDM) terpolymers;

(ii) one or more elastomers (B) selected from ethylene-propylene (EPM) copolymers and ethylene-propylene-diene (EPDM) terpolymers and relative mixtures, the above elastomers (B) having been previously treated with at least one hydroperoxide at a temperature ranging from 80° C. to 250° C. so as to undergo a reduction in the molecular weight:

the weight ratio between the elastomers (i) and (ii), having a sum of 100, being from 0/100% to 90/10%, preferably from 0/100% to 75/25%.

The elastomer (A) is selected from EPM (ethylene-propylene) copolymers and/or from EPDM terpolymers (ethylene-propylene-non-conjugated diene terpolymers), in which the ethylene weight content ranges from 85% to 40%, preferably from 76% to 45%. The optional non-conjugated diene is present in a maximum quantity of 12% by weight, preferably 5% by weight. Furthermore, the polymer (A) has the following properties:

Weight average molecular weight (Mw) ranging from 70,000 to 500,000, preferably from 90,000 to 450,000;

Polydispersity expressed as Mw/Mn lower than 5, preferably from 1.8 to 4.9;

Ratio between the Melt Flow Index at a weight of 21.6 kg and the Melt Flow Index at a weight of 2.16 kg, both effected at a temperature of 230° C., ranging from 18 to 60, preferably from 20 to 40.

The molecular weight Mw is determined via GPC with a refraction index detector.

In the case of EPDM, the diene is selected from:

linear chain dienes such as 1,4-hexadiene and 1,6-octadiene;

acyclic dienes with a branched chain such as 5-methyl-1,4-hexadiene; 3,7-dimethyl-1,6-octadiene; 3,7-dimethyl-1,7-octadiene;

alicyclic dienes with a single ring such as 1,4-cyclohexadiene; 1,5-cyclo-octadiene; 1,5-cyclododecadiene;

dienes having condensed and bridged alicyclic rings, such as methyl tetrahydroindene, dicyclopentadiene; bicyclo[2.2.1]hepta-2,5-diene; alkenyl, alkylidene, cyclo-alkenyl and cyclo-alkylidene norbornenes such as 5-methylene-2-norbornene; 5-ethylidene-2-norbornene (ENB); 5-propenyl-2-norbornene.

In the preferred embodiment the diene is 5-ethylidene-2-norbornene (ENB).

The elastomer (B) is obtained according to what is described in EP-A-1013673, i.e. by the shear treatment in the presence of hydroperoxides of a polymeric base essentially consisting of ethylene-propylene elastomeric copolymers (EPM copolymers) and/or ethylene-propylene-diene terpolymers (EPDM terpolymers).

More specifically, the elastomer (B) is obtained by treating an EP(D)M polymer with at least one hydroperoxide at a temperature ranging from 100° C. to 250° C., preferably from 160° C. to 200° C. The above hydroperoxide preferably has a halving time, at the process temperature, not lower than 5 times the process time. The concentration of hydroperoxide ranges from 0.1 to 15% by weight with respect to the polymer, preferably from 0.5 to 4% by weight; the process shear value is preferably higher than 100 $sec^{-1}$, more preferably higher than 500 $sec^{-1}$. The process for the preparation of the polymer (B) can be carried out in a continuous extruder or, preferably, in a twin-screw extruder or extruder of the ko-kneter type.

The elastomer (B) has the following characteristics:

weight average molecular weight (measured via GPC with a refraction index detector) within the range of 50,000-300,000, preferably 70,000-200,000;

polydispersity expressed as Mw/Mn lower than 6, preferably from 1.8 to 5;

Ratio between the Melt Flow Index at a weight of 21.6 kg and the Melt Flow Index at a weight of 2.16 kg, both effected at a temperature of 230° C., ranging from 35 to 110, preferably from 45 to 90. In any case, the value of this ratio is at least 40% higher with respect to polymer (A).

In the blend of the present invention, the elastomeric component (B) can be used as such or, for economic and/or practical reasons in the subsequent processing, it can be mixed with reinforcing fillers (for example carbon black and silica) up to a maximum of 50% by weight, preferably up to a maximum of 25% by weight, and/or plasticizers (for example solid paraffin or paraffinic oil) up to a maximum of 60% by weight.

The mixture of the present invention also comprises, in addition to carbon black and the elastomeric components (A+B) indicated above, mineral fillers, plasticizers, vulcanization additives, etc.

The total of the elastomeric components (A+B) of the blend object of the invention corresponding to 100 parts, the remaining parts of the blend are thus composed:

- from 20 to 350 parts of carbon black, preferably from 50 to 200;
- from 0 to 200 parts, preferably from 0 to 50 parts, of mineral filler, preferably selected from calcium carbonate, kaolin, silica and talc;
- from 0 to 160 parts, preferably from 25 to 120 parts of plasticizers, the preferred being mineral oil and paraffinic wax;
- from 0 to 5 parts of process coadjuvant additive, stearic acid and polyethylene glycol being preferred;
- from 0 to 5 parts of antioxidant, Anox HB® (Great Lakes) being preferred;
- from 0 to 5 parts of Zinc or Lead oxide.

Vulcanizing agents well known to experts in the field and adopted for the vulcanization of blends based on ethylene-propylene elastomers, are also used.

These are typically organic peroxides and co-agents for EPM and EPDM based on sulfur and accelerators for EPDM.

These additives can be added either during the first phase of the mixing or, preferably, during a subsequent phase: the choice of the vulcanizing system and feeding method, however, depends on the type of equipment and technologies used in the mixing phase and do not influence the properties claimed in the present invention.

The blends object of the present invention can be produced with a lower mixing energy consumption and with a greater productivity, thus causing a distinct saving in the overall cost of the blend.

Mixing processes in continuous with equipment typically used for thermoplastics are, in fact, extremely critical in the case of blends requiring significant specific works for the distribution of the carbon black; specific works which, with equipment of this kind (extremely reduced time scale), unequivocally lead to great reductions in the molecular weight of the polymeric base and a considerable increase in the temperature. Part of the competitive potentiality of these technologies is linked to the possibility of feeding the vulcanization reagents directly to the extruder; this is possible only on the condition that the temperature in the final screw sections is compatible with the scorch temperatures of the vulcanizing systems used.

It is therefore extremely important to have low specific works (referring to energy necessary for processing the weight or volume unit of the blend), to have a lower temperature at the end of the process and to be able to feed the vulcanizing additives into an extruder. The flow-rate of the extruder does in fact vary in relation to the scorch temperature of the vulcanizing system and the greater the specific work required for producing the blend, the lower the final flow-rate will be.

The following examples are provided for a better understanding of the present invention.

EXPERIMENTAL EXAMPLES

Figure 1:
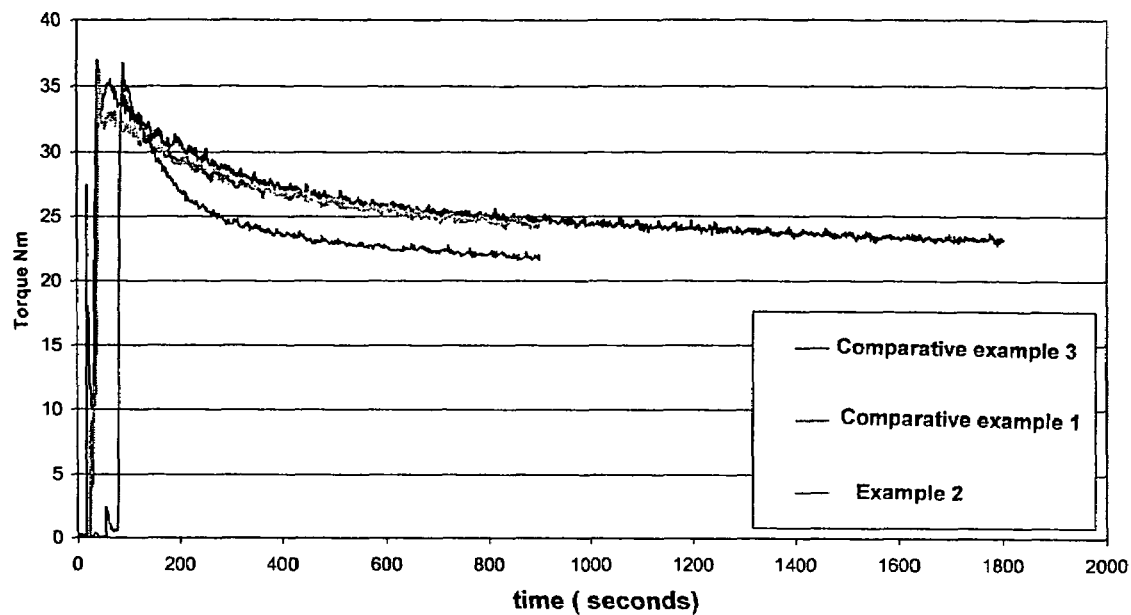
FIGS. 1 and 2 are graphical representations of torque trend with time, during the mixing phase, for Example 2 and Comparative Examples 1 and 3.

Materials:
Commercial EPM (ethylene-propylene copolymer):
Polimeri Europa Dutral® CO059 having 40% wt of propylene;
ML (1+4) at 125° C.=75
MFI (L)=0.13 g/10'
  Commercial oil-extended EPDM (ethylene-propylene-diene terpolymers): Polimeri Europa Dutral® TER4436 having 40% oil. The polymeric matrix contains 28% wt of propylene, 4.0% wt of ethylidene norbornenes;
ML (1+4) at 125° C.=42
MFI (L)=0.23 g/10'
  Commercial EPM: Polimeri Europa Dutral® CO054 having 40% wt of propylene;
ML (1+4) at 125° C.=30
  t-butyl hydroperoxide (TBHP) of Akzo Nobel Chem. at 70% in aqueous solution (trade-name Trigonox® AW70)
  Commercial paraffinic oil Preparation of the Polymeric Base (B) 1

The following preparation was carried out in a plastograph with a 70 cc mixing chamber equipped with roller rotors and externally thermostat-regulated at 130° C., according to what is described in EP-A-1013673.

Parent Polymer: Dutral Ter 4436
TBHP=0.8%
Mixing of ingredients at 50 RPM for 1 min
RPM=200 per 2 min.
T Max of the molten product=200° C.

Characterizations of the end-product:
Solubility in xylene>99.9%
MFI (L)=0.3 g/10'

Comparative Example 1

The following formulation was prepared in a laboratory plastograph with a 70 cc chamber:

167 Parts of TER4436 (type A elastomer)
110 parts of Carbon black of the type FEF 550
10 parts of paraffinic wax Mixing conditions:
Roller type rotors
Rotation rate of the rotors 60 revs/min
Outside temperature 80° C.

The carbon black was added in a first phase, and after about a minute the plug was raised and the polymeric base TER4436 was added.

From when the carbon black was fed, the acquisition program of the torque and temperature of the molten product was activated for a period of 15 minutes.

The blend was finally discharged.

Example 2

The following formulation was prepared in a laboratory plastograph with a 70 cc chamber:

167 parts of the polymeric base (B) 1
110 parts of Carbon black of the type FEF 550
10 parts of paraffinic wax Mixing conditions:
Roller type rotors
Rotation rate of the rotors 60 revs/min
Outside temperature 80° C.

The carbon black was added in a first phase, and after about 1.5 minutes the plug was raised and the polymeric base was added.

From when the carbon black was fed, the acquisition program of the torque and temperature of the molten product was activated for a period of 15 minutes.

The blend was finally discharged.

Comparative Example 3

This comparative example was carried out as it was extremely difficult to process the torque data of the product of Comparative example 1. It was therefore decided to effect a further comparative example with a mixing time of 30 minutes instead of 15.

The following formulation was prepared in a laboratory plastograph with a 70 cc chamber:

167 Parts of TER4436 (type A elastomer)
110 parts of Carbon black of the type FEF 550
10 parts of paraffinic wax Mixing conditions:
Roller type rotors
Rotation rate of the rotors 60 revs/min
Outside temperature 80° C.

The carbon black was added in a first phase, and after about a minute the plug was raised and the polymeric base TER4436 was added.

From when the carbon black was fed, the acquisition program of the torque and temperature of the molten product was activated for a period of 30 minutes.

The blend was finally discharged.

Comments on Examples 1-3

Figure 2:
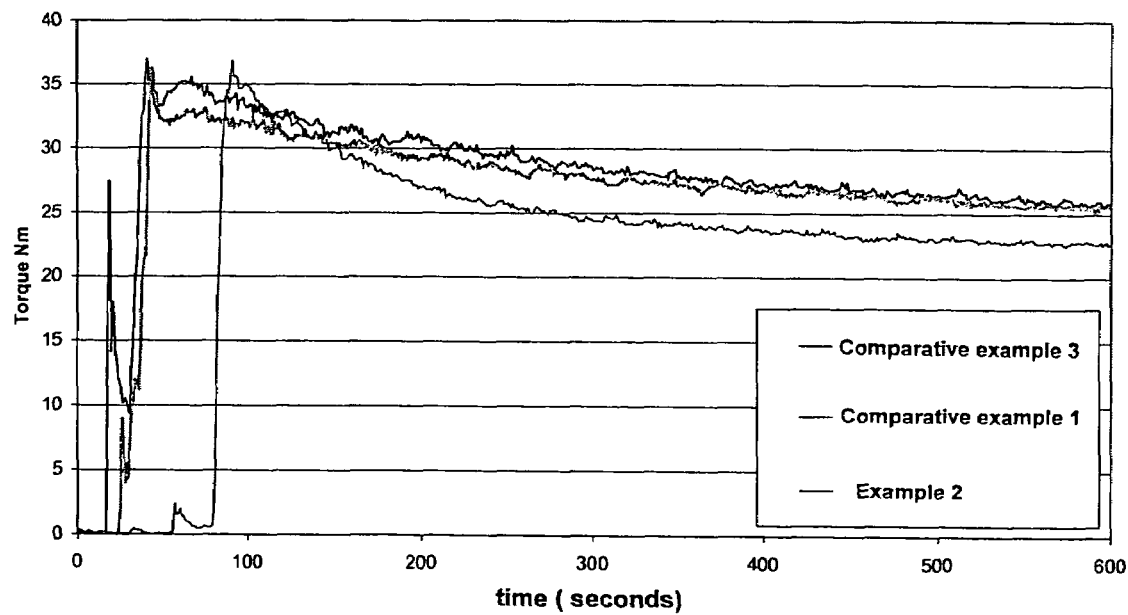

The graphs relating to the torque trend with the time, during the mixing phase, are indicated superimposed in FIG. 1 and FIG. 2 (for the first 10 minutes).

The differences in behaviour, between the examples relating to the invention and the comparative example, are evident from the torque trend during the mixing. It can be observed from the figure that the product of example 2 has a lower torque value, with substantially the same viscosity of the polymeric base, for the whole duration of the mixing.

Since, as is well known to experts in the field, with the same viscosity of the polymeric base, the lower the viscosity of the blend, the better the dispersion of the carbon black, it is legitimate to expect a more rapid and efficient distribution of the carbon black for the blend corresponding to the lowest torque/time curve, thus relating to the example of the invention.

Examples 4-6

The following examples demonstrate the improvement which can be obtained according to the present invention also when, for economical reasons, the post-modified product (B) is used as minority component of the blend in only partial substitution of the commercial product (with an evident saving in the overall cost).

In the following examples, the post-treated polymeric base (B) 2 was used as polymeric base (B).

Preparation of the Polymeric Base (B) 2

A Maris TM35V laboratory twin-screw extruder is used, with a screw diameter of 35 mm and L/D=32.

According to what is described in EP-A-1013673, the test was carried out with an hourly flow-rate of about 5 kg, leaving the extruder to run under regime conditions for about 40 min. before collecting the product.

Parent Polymer: Dutral CO059
RPM=220
Temperature in the high shear areas=175-200° C.
TBHP=1%
Antioxidant=1.5%

Characterizations of the end-product:
Solubility in xylene>99.9%
ML (1+4) at 125° C.=29
MFI (L)=0.23 g/10'

Comparative Example 4

The following formulation was prepared in a laboratory plastograph with a 70 cc chamber:

Elastomeric composition:
50 parts of CO059 (type A elastomer)
50 parts of CO054 (type A elastomer)
110 parts of Carbon black of the type FEF 550
70 parts of paraffinic-type oil Mixing conditions:
Roller type rotors
Rotation rate of the rotors 60 revs/min
Outside temperature 80° C.

The carbon black and paraffinic oil were added in a first phase, after about a minute the plug was raised and the polymeric base was added.

From when the plug was lowered, the acquisition program of the torque and temperature of the molten product was activated for a period of 30 minutes.

The blend was finally discharged.

The polymers used for this test were homogenized in an open mixer; a sample was thus obtained for determining the Mooney viscosity of the overall elastomeric composition.

ML (1+4) at 125° C. of the initial elastomeric composition=46

Example 5

The following formulation was prepared in a laboratory plastograph with a 70 cc chamber:

Elastbmeric composition:
25 parts of CO059 (type A elastomer)
45 parts of CO054 (type A elastomer)
30 parts of the polymeric base (B) 2
110 parts of Carbon black of the type FEF 550
70 parts of paraffinic-type oil Mixing conditions:
Roller type rotors
Rotation rate of the rotors 60 revs/min
Outside temperature 80° C.

The carbon black and paraffinic oil were added in a first phase, after about a minute the plug was raised and the mixture of the three polymers was added.

From when the plug was lowered, the acquisition program of the torque and temperature of the molten product was activated for a period of 30 minutes.

The blend was finally discharged.

The three polymers used for this test were homogenized in an open mixer; a sample was thus obtained for determining the Mooney viscosity of the overall elastomeric composition.

ML (1+4) at 125° C. of the initial elastomeric composition=43.5

Example 6

The following formulation was prepared in a laboratory plastograph with a 70 cc chamber:

Elastomeric composition:
30 parts of CO059 (type A elastomer)
45 parts of CO054 (type A elastomer)
25 parts of the polymeric base (B) 2
110 parts of Carbon black of the type FEF 550
70 parts of paraffinic-type oil Mixing conditions:
Roller type rotors
Rotation rate of the rotors 60 revs/min
Outside temperature 80° C.

The carbon black and paraffinic oil were added in a first phase, after about a minute the plug was raised and the mixture of the-three polymers was added.

From when the plug was lowered, the acquisition program of the torque and temperature of the molten product was activated for a period of 30 minutes.

The blend was finally discharged.

The three polymers used for this test were homogenized in an open mixer; a sample was thus obtained for determining the Mooney viscosity of the overall elastomeric composition.

ML (1+4) at 125° C. of the initial elastomeric composition=47

Comments on Examples 4-6

Figure 3:
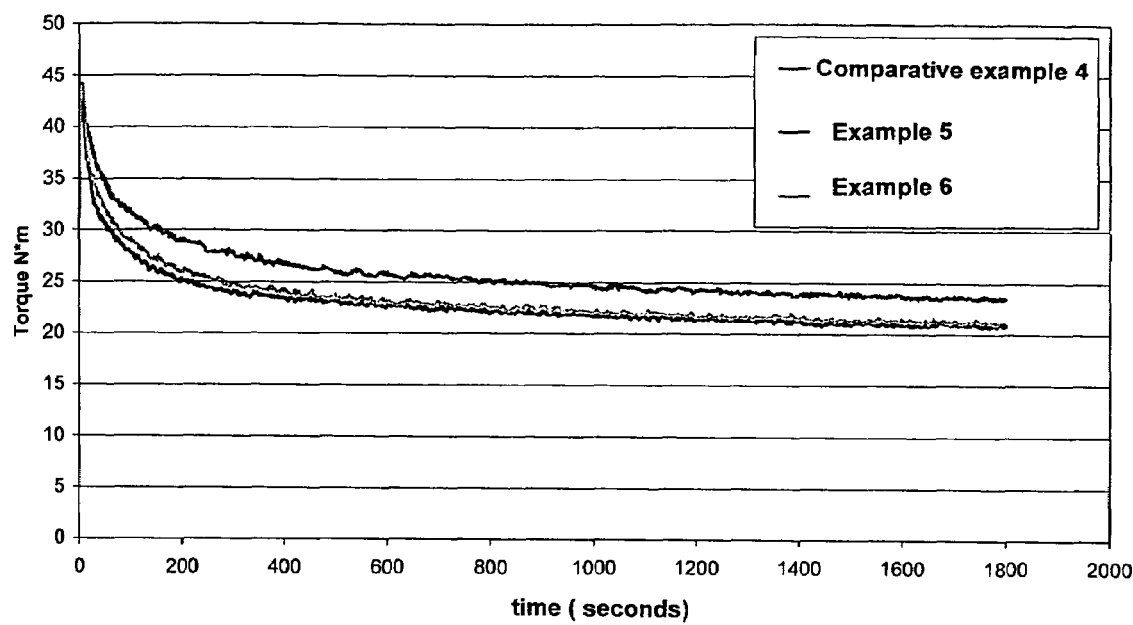
FIGS. 3 and 4 are graphical representations of torque trend with time, during the mixing phase, for Examples 5 and 6 and Comparative Example 4.
Figure 4:
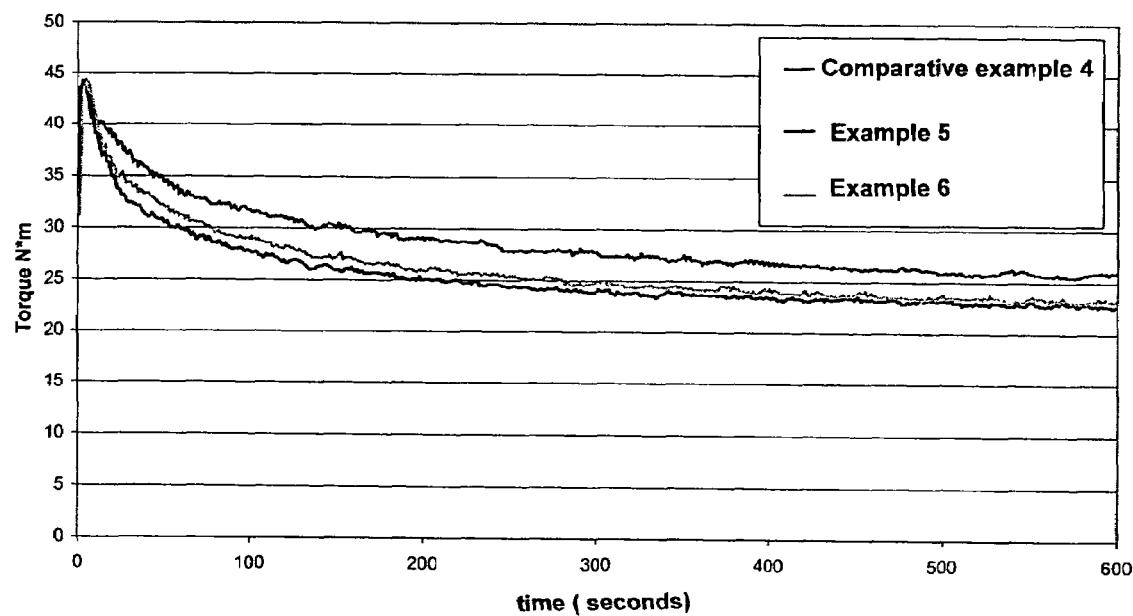

The graphs relating to the torque trend with the time, during the mixing phase, are indicated superimposed in FIG. 3 and FIG. 4 (for the first 10 minutes).

The differences in behaviour, between the examples relating to the invention and the comparative example, are evident from the torque trend during the mixing. It can be observed from the figure that the product of examples 5 and 6 are similar and both have a lower torque value, with substantially the same viscosity of the elastomeric composition, for the whole duration of the mixing.

Since, as is well known to experts in the field, with the same ML of the t.q., the lower the viscosity of the blend, the better the dispersion of the carbon black, it is legitimate to expect a more rapid and efficient distribution of the carbon black for the blend corresponding to the lowest torque/time curve thus relating to the example of the invention.

According to what is specified in the article "Aspects of Rubber Processability" Kautschuk+Gummi Kunststoffe volume 38: issue 10/85 page 912, the t' point of the mixing process was determined together with the relative specific work by means of the torque logarithm vs time logarithm graph.

The t' point defines the time to which the completion of the distribution phase of the carbon black inside the blend i.e. break-up of the agglomerates of particles, corresponds. In other words, at the t' point, the blend is ready to be discharged. A possible prolonging of the mixing would not be productive for obtaining a better dispersion of the carbon black.

The t' point was determined on the basis of the concept according to which over this time, the deterioration of the torque logarithm with respect to the time logarithm, is linear. Starting from high mixing times, a linear regression was effected, defining, as t' point, the time wherein the highest values of the statistic parameters $R^2$ and F are obtained, for the regression.

Figure 5:
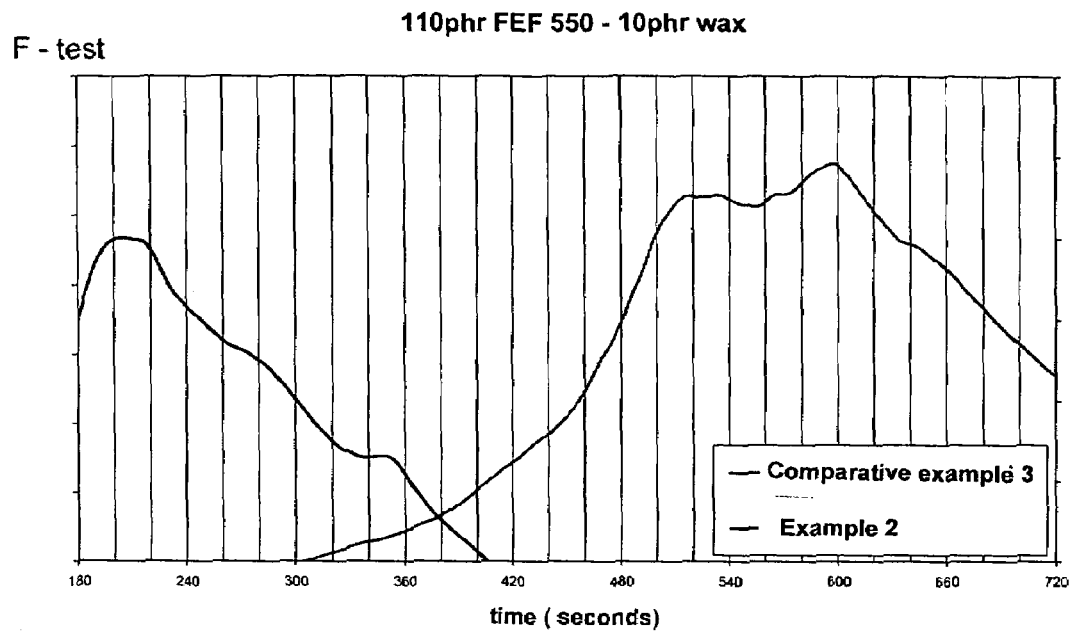
FIG. 5 is a graphical representation of the trend curves for parameter F (F test) for Example 2 and Comparative Example 3.
Figure 6:
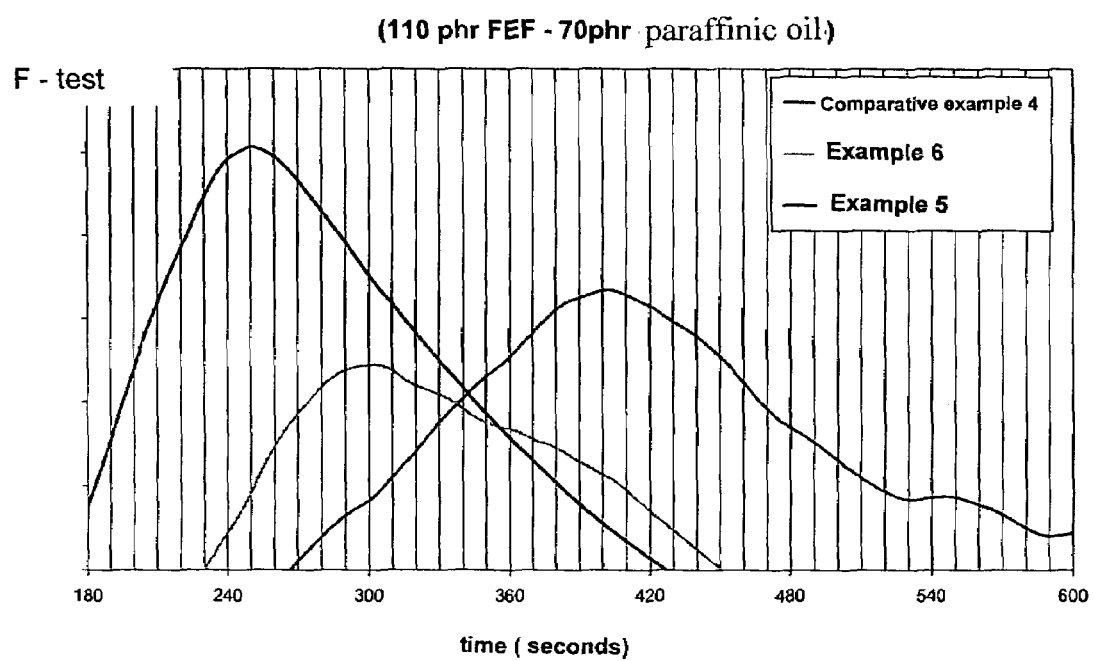
FIG. 6 is a graphical representation of the trend curves for parameter F (F test) for Examples 5 and 6 and Comparative Example 4.

The trend curves of the parameter F (F test) referring to the processing of the data of the experimental examples 2 and 3 (comparative) are indicated in FIG. 5; those relating to examples 4 (comparative), 5 and 6 are indicated in FIG. 6.

The results obtained according to the method described are specified in Table 1 below, which indicates the specific energy values Wu', i.e. the work necessary for the complete dispersion of the carbon black.

The temperature values at t' point, corresponding to the final temperature of the mixing process, are also specified.

TABLE 1

| Ex. | MFI (230° C.) Elast. composition | T' point (seconds) | Wu' (MJ/m$^3$) | T at t' point (° C.) |
|---|---|---|---|---|
| 2 | 0.3 | 207 | 1089 | 146 |
| 3 comp. | 0.23 | 597 | 3207 | 158 |

| Example | ML (1 + 4) at 125° C. Elast. composition | t' point (seconds) | Wu' (MJ/m$^3$) | T at t' point (° C.) |
|---|---|---|---|---|
| 4 comp. | 46 | 402 | 1592 | 125 |
| 5 | 43.5 | 251 | 930 | 116 |
| 6 | 47 | 302 | 1131 | 118 |

The values indicated in Table 1 demonstrate the efficacy of the present invention. This efficacy is also evident from an examination of FIGS. 1-4.

The difference in specific work is distinct; the differences in the discharge temperature of the blend are also evident. In examples 5 and 6 relating to the invention, it is in fact possible to envisage the feeding of vulcanizing additives in a single passage (with a consequent advantage in the simplification and economy of the process), whereas this would not be possible in comparative example 4.

In the case of examples 2-3, the temperatures are higher as the molecular weight of the starting polymeric bases is higher and because the temperature of the mixing chamber has been maintained higher, there is still, however, a difference in temperature at the t' point of 12° C. among the comparative tests.

The differences in the t' point i.e. in the packing time of the blend deserve particular mention. The blends of the present invention have much lower packing times with respect to the reference blends even when the post-modified product (elastomer B), following a more economical method in the application of the present invention, is used in a minority mixture with commercial products.

The lower packing time of the blend and lower energy consumption lead to a saving in the overall cost of the batch process.

Should this type of blend be applied to continuous processes (with the feeding of vulcanizing additives on line) the lower heat evolution and lower specific work are equivalent to the possibility of a significant increase in the process flow-rate.

The invention claimed is:

1. An elastomeric blend comprising an elastomeric composition and carbon black, the above elastomeric composition consisting of:
   (i) one or more elastomers (A) selected from ethylene-propylene (EPM) copolymers and ethylene-propylene-diene (EPDM) terpolymers;
   (ii) one or more elastomers (B) selected from ethylene-propylene (EPM) copolymers and ethylene-propylene-diene (EPDM) terpolymers and relative mixtures, the above one or more elastomers (B) having been previously treated with at least one hydroperoxide at a process temperature ranging from 100° C. to 250° C., with the proviso that said hydroperoxide has a halving time, at the process temperature, not lower than 5 times the process time:
   the weight ratio between the elastomers (i) and (ii), having a sum of 100, being from 0/100% to 90/10.

2. The elastomeric blend according to claim 1, wherein the weight ratio between the elastomers (i) and (ii), having a sum of 100, ranges from 0/100% to 75/25%.

3. The elastomeric blend according to claim 1, wherein the ethylene-propylene (EPM) copolymer of the elastomer (i) has a weight content of ethylene ranging from 85% to 40%.

4. The elastomeric blend according to claim 3, wherein the ethylene-propylene (EPM) copolymer has a weight content of ethylene ranging from 76% to 45%.

5. The elastomeric blend according to claim 1, wherein the ethylene-propylene-non-conjugated diene (EPDM) terpolymer of the elastomer (i) has an ethylene content ranging from 85% to 40% and a maximum diene content of 12% by weight, the complement to 100 consisting of propylene.

6. The elastomeric blend according to claim 5, wherein the ethylene-propylene-non-conjugated diene (EPDM) terpolymer has an ethylene content ranging from 85% to 40% and a maximum diene content of 5% by weight, the complement to 100 consisting of propylene.

7. The elastomeric blend according to claim 1, wherein the polymer (A) has the following properties:
   Weight average molecular weight (Mw) ranging from 70,000 to 500,000;
   Polydispersity expressed as Mw/Mn lower than 5;
   Ratio between the Melt Flow Index at a weight of 21.6 kg and the Melt Flow Index at a weight of 2.16 kg, both effected at a temperature of 230° C., ranging from 18 to 60.

8. The elastomeric blend according to claim 7, wherein the polymer (A) has the following properties:
   Weight average molecular weight (Mw) ranging from 90,000 to 450,000;
   Polydispersity expressed as Mw/Mn ranging from 1.8 to 4.9;
   Ratio between the Melt Flow Index at a weight of 21.6 kg and the Melt Flow Index at a weight of 2.16 kg, both effected at a temperature of 230° C., ranging from 20 to 40.

9. The elastomeric blend according to claim 1, wherein the polymer (B) has the following characteristics:
   weight average molecular weight from 50,000 to 300,000;
   polydispersity expressed as Mw/Mn lower than 6;
   Ratio between the Melt Flow Index at a weight of 21.6 kg and the Melt Flow Index at a weight of 2.16 kg, both effected at a temperature of 230° C., ranging from 35 to 110.

10. The elastomeric blend according to claim 9, wherein the polymer (B) has the following characteristics:
    weight average molecular weight from 70,000 to 200,000;
    polydispersity expressed as Mw/Mn ranging from 1.8 to 5;
    ratio between the Melt Flow Index at a weight of 21.6 kg and the Melt Flow Index at a weight of 2.16 kg, both effected at a temperature of 230° C., ranging from 45 to 90.

11. The elastomeric blend according to claim 10, wherein the polymer (B) has a ratio between the Melt Flow Index at a weight of 21.6 kg and the Melt Flow Index at a weight of 2.16 kg, both effected at a temperature of 230° C., at least 40% higher with respect to polymer (A).

12. The elastomeric blend according to claim 1, wherein the total of the elastomeric components (A+B) corresponding to 100 parts, the remaining parts of the blend are thus composed:
    from 20 to 350 parts of carbon black;
    from 0 to 200 parts of mineral filler;
    from 0 to 160 parts of plasticizer;
    from 0 to 5 parts of process coadjuvant additive;
    from 0 to 5 parts of antioxidant;
    from 0 to 5 parts of Zinc or Lead oxide.

13. The elastomeric blend according to claim 12, wherein the total of the elastomeric components (A+B) corresponding to 100 parts, the remaining parts of the blend are thus composed:
    from 50 to 200 parts of carbon black;
    from 0 to 50 parts of mineral filler, selected from calcium carbonate, kaolin, silica and talc;
    from 25 to 120 parts of plasticizer, selected from mineral oil and paraffinic wax;
    from 0 to 5 parts of process coadjuvant additive, selected from stearic acid and polyethylene glycol;
    from 0 to 5 parts of antioxidant;
    from 0 to 5 parts of Zinc or Lead oxide.

* * * * *